United States Patent Office 3,543,265
Patented Nov. 24, 1970

3,543,265
TRIMETHYLHYDRAZINOMETHYL-4-(METHYLTHIO)-PHENOLS
Henri Sidi, Paramus, N.J., assignor to Tenneco Chemicals, Inc., a corporation of Delaware
No Drawing. Filed Oct. 16, 1967, Ser. No. 675,334
Int. Cl. C07c *109/04*
U.S. Cl. 260—569     3 Claims

ABSTRACT OF THE DISCLOSURE

Trialkylhydrazinomethylphenols are prepared by the reaction of phenols with trialkyldrazines and formaldehyde. Illustrative of these compounds are trimethylhydrazinomethyl-4-methylphenol, trimethylhydrazinomethyl-3,5-dimethylphenol, and trimethylhydrazinomethyl-4-methylthio-m-cresol.

---

This invention relates to trialkylhydrazinomethylphenols and to a process for their production. More particularly, it relates to trimethylhydrazinomethylphenols and to their production by the reaction of a phenolic compound with trimethylhydrazine and formaldehyde.

Trialkylhydrazinomethylphenols that have the structural formula

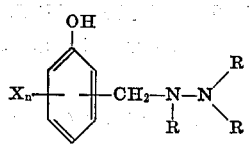

wherein each X represents chlorine, a nitro group, an alkyl group having 1 to 4 carbon atoms, an alkoxy group having 1 to 4 carbon atoms, or an alkylthio group having 1 to 4 carbon atoms; each R represents an alkyl group having 1 to 4 carbon atoms; and $n$ represents an integer in the range of zero to three, are valuable as intermediates in the preparation of compounds that are effective as insecticides. The reaction of these trialkyldrazinomethylphenols with alkyl isocyanates to form N-alkyl carbamates and the use of the carbamates as insecticides are described in detail in my copending application Ser. No. 675,362 which was filed on Oct. 16, 1967.

The trialkylhydrazinomethylphenols of this invention may be prepared by contacting phenol or a substituted phenol with a trialkylhydrazine and formaldehyde. The reaction that takes place is indicated by the following equation:

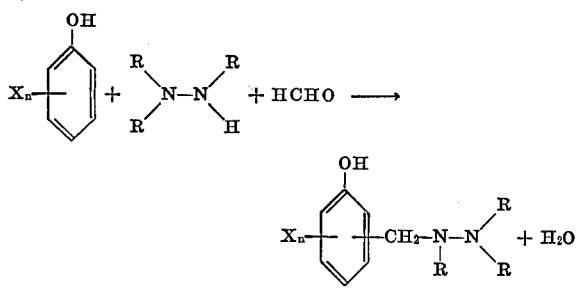

wherein X, R, and $n$ have the aforementioned significance. The products obtained by this reaction are generally mixtures of isomers. The position of the trialkylhydrazinomethyl group on the aromatic ring of the novel compounds is dependent to a large degree upon the nature and number of the X substituents and their arrangement on the ring.

A wide variety of phenolic compounds can be converted to trialkylhydrazinomethylphenols by the process of this invention. These include phenol and phenols having one or more chlorine, lower alkyl, lower alkoxy, nitro, or alkylthio substituents. Illustrative of these substituted phenols are cresols, tert. butylphenols, dimethylphenols, methoxyphenols, ethoxyphenols, butoxyphenols, monochlorophenols, dichlorophenols, methylthiophenols, methylthiocresols, chloronitrophenols, and the like.

The trialkylhydrapines that may be used in the process of this invention have the structural formula

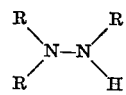

wherein each R represents an alkyl group having from 1 to 4 carbon atoms. Trimethylhydrazine is the preferred trialkylhydrazine. The preparation of the trialkylhydrazines by a process in which an asymmetrical dialkylhydrazine is reacted with an aldehyde to form an alkylidenedialkylhydrazine which is then hydrogenated in the presence of a noble metal or Raney nickel hydrogenation catalyst is described in my copending patent application Ser. No. 677,867 which was filed on Oct. 25, 1967.

While aqueous solutions containing about 30 percent to 50 percent by weight of formaldehyde are ordinarily used in the reaction, low molecular weight polymers of formaldehyde, such as trioxane, α-polyoxymethylene, and paraformaldehyde, can also be used in this process.

The trialkylhydrazinomethylphenols may be prepared in good yield by contacting phenol or a substituted phenol with substantially equivalent amounts of formaldehyde and a trialkylhydrazine at a temperature below about 40° C. If desired, an excess of up to about 30% of the formaldehyde and/or the trialkylhydrazine may be used. In a preferred embodiment of the invention, a phenol is heated in an aqueous solution of a trialkylhydrazine at a temperature in the range of about 40° to 60° C. until a solution is obtained which remains free from precipitated solids when it is cooled to 25°–30° C. To this reaction mixture formaldehyde is added slowly while the temperature of the mixture is maintained at about 20° to 30° C. by the use of external cooling. When the reaction has been completed, the product may be recovered from the reaction mixture by extracting the organic layer formed with a solvent, such as diethyl ether, and then removing the solvent by evaporation.

The invention is further illustrated by the examples that follow.

EXAMPLE 1

A reaction mixture containing 30.7 grams (0.2 mole) of 4-methylthio-m-cresol and 75.3 grams (0.24 mole) of an aqueous solution containing 24.2 percent of trimethylhydrazine was stirred at 50° C. until the mixture became a liquid and remained liquid when it was cooled to room temperature. To this mixture was added dropwise 19.5 grams (0.24 mole) of a 37 percent aqueous formaldehyde solution while external cooling was used to maintain the temperature of the reaction mixture at 25°–30° C. When all of the formaldehyde had been added, the reaction mixture was stirred at 25°–30° C. for 6 hours. The organic phase that separated from the reaction mixture was extracted with diethyl ether. The ether extract was dried over sodium sulfate, filtered, and then heated under vacuum to remove the ether. The trimethylhydrazinomethyl-4-methylthio-m-cresol, which was obtained in a yield of 78 percent, was a yellow oil that contained 11.46% N, 61.16% C, and 7.74% H (calculated for $C_{12}H_{20}N_2OS$, 11.65% N, 60.0% C, and 8.32% H). The structure of the compound was confirmed by infrared analysis.

EXAMPLES 2–13

A series of trimethylhydrazinomethylphenols was prepared by the general procedure described in Example 1. The compounds prepared and their analyses are given in the table that follows.

TABLE

| Ex. No. | Compound | Found N | Found C | Found H | Calculated N | Calculated C | Calculated H |
|---|---|---|---|---|---|---|---|
| 2 | Trimethylhydrazinomethylphenol | 12.2 | 69.0 | 8.10 | 15.5 | 66.7 | 8.8 |
| 3 | Trimethylhydrazinomethyl-2-methylphenol | 12.48 | 70.06 | 8.60 | 14.4 | 68.1 | 9.27 |
| 4 | Trimethylhydrazinomethyl-3-methylphenol | 11.86 | 68.21 | 8.74 | 14.4 | 68.1 | 9.27 |
| 5 | Trimethylhydrazinomethyl-4-methylphenol | 11.83 | 69.05 | 8.60 | 14.4 | 68.1 | 9.27 |
| 6 | Trimethylhydrazinomethyl-3-5-dimethylphenol | 11.92 | 71.73 | 9.3 | 13.45 | 69.2 | 9.6 |
| 7 | Trimethylhydrazinomethylguaiacol | 12.65 | 64.37 | 7.39 | 13.32 | 62.8 | 8.56 |
| 8 | Trimethylhydrazinomethyl-4-methoxyphenol | 11.16 | 63.77 | 8.17 | 13.32 | 62.8 | 8.56 |
| 9 | Trimethylhydrgzinomethyl-2-chlorophenol | 10.37 | 54.92 | 6.13 | 13.05 | 55.8 | 7.0 |
| 10 | Trimethylhydrazinomethyl-4-chlorophenol | 10.28 | 55.29 | 5.88 | 13.05 | 55.8 | 7.0 |
| 11 | Trimethylhydrazinomethyl-2-nitrophenol | 16.07 | 53.3 | 5.21 | 18.65 | 53.3 | 6.67 |
| 12 | Trimethylhydrazinomethyl-4-nitrophenol | 15.32 | 48.4 | 5.20 | 18.65 | 53.3 | 6.67 |
| 13 | Trimethylhydrazinomethyl-4-(methylthio)-phenol | 9.78 | 56.4 | 7.37 | 12.4 | 58.3 | 7.95 |

Each of the other phenols and trialkylhydrazines mentioned above can also be used in the process described in Example 1 to form other trialkylhydrazinomethylphenols.

The terms and expressions which had been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:
1. A compound having the structural formula

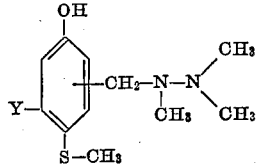

wherein Y represents hydrogen or methyl.

2. The compound as set forth in claim 1 wherein Y represents methyl.
3. The compound as set forth in claim 1 wherein Y represents hydrogen.

References Cited

UNITED STATES PATENTS

| 3,219,700 | 11/1965 | O'Shea et al. | 260—569 |
| 3,243,459 | 3/1966 | O'Shea | 260—569 |

FOREIGN PATENTS

| 981,460 | 1/1965 | Great Britain. |
| 1,225,644 | 9/1966 | Germany. |

OTHER REFERENCES

Hinman et al.: "Jour. Amer. Chem. Soc.," vol. 82, pp. 3988–92 (1968).

ROBERT V. HINES, Primary Examiner

U.S. Cl. X.R.

260—471, 583, 609; 424—330